(12) United States Patent
Hsu

(10) Patent No.: US 8,660,691 B2
(45) Date of Patent: Feb. 25, 2014

(54) AUTOMATIC MACHINE AND METHOD FOR CONTROLLING THE SAME

(75) Inventor: Fu-Kuan Hsu, Taipei (TW)

(73) Assignee: Compal Communications, Inc., Neihu, Taipei (TW)

( * ) Notice: Subject to any disclaimer, the term of this patent is extended or adjusted under 35 U.S.C. 154(b) by 463 days.

(21) Appl. No.: 13/101,146

(22) Filed: May 5, 2011

(65) Prior Publication Data

US 2011/0313570 A1      Dec. 22, 2011

(30) Foreign Application Priority Data

Jun. 18, 2010   (TW) ............................... 99120012 A

(51) Int. Cl.
    *G06F 19/00*      (2011.01)
(52) U.S. Cl.
    USPC ........... 700/245; 700/250; 455/420; 455/418; 446/141; 446/142; 379/88.03
(58) Field of Classification Search
    USPC .................... 700/245, 250, 94; 446/141, 142; 379/88.03; 382/275, 255; 348/241; 455/566, 561
    See application file for complete search history.

(56) References Cited

U.S. PATENT DOCUMENTS

| | | | |
|---|---|---|---|
| 6,570,353 B2 | 5/2003 | Krotsch | |
| 6,718,231 B2* | 4/2004 | Konno et al. | 700/245 |
| 6,943,520 B2 | 9/2005 | Furuta | |
| 7,057,367 B2* | 6/2006 | Furuta et al. | 318/568.12 |
| 7,630,986 B1* | 12/2009 | Herz et al. | 1/1 |
| 7,663,332 B2* | 2/2010 | Fukuda et al. | 318/568.12 |
| 7,962,629 B2* | 6/2011 | Bigioi et al. | 709/227 |
| 8,340,817 B2* | 12/2012 | Honda et al. | 700/245 |
| 8,386,076 B2* | 2/2013 | Honda et al. | 700/245 |
| 2007/0005822 A1* | 1/2007 | Yamamoto et al. | 710/15 |
| 2011/0143811 A1* | 6/2011 | Rodriguez | 455/556.1 |
| 2011/0212717 A1* | 9/2011 | Rhoads et al. | 455/420 |

FOREIGN PATENT DOCUMENTS

| | | |
|---|---|---|
| JP | H11345018 A | 12/1999 |
| JP | 2004291202 | 10/2004 |
| TW | 529237 | 4/2003 |
| TW | I220661 | 9/2004 |

* cited by examiner

*Primary Examiner* — Ronnie Mancho
(74) *Attorney, Agent, or Firm* — Winston Hsu; Scott Margo

(57) ABSTRACT

An automatic machine includes an output unit, a storage unit and a control unit. The storage unit stores a motion pattern corresponding to a command and recording N predetermined motion information and N time tags. The control unit receives the command, reads a current motion information of the output unit, looks the motion pattern up in the storage unit according to the command and the current motion information, determines that the current motion information is between the i-th predetermined motion information and the (i+1)-th predetermined motion information, calculating a time adjusting information by the (i+1)-th predetermined motion information, the (i+1)-th time tag and the current motion information, and controls the output unit to execute the (i+1)-th predetermined motion information according to the current motion information, the first time tag through the i-th time tag, and the time adjusting information.

12 Claims, 5 Drawing Sheets

| Header | Number of motion frames | Motion trend of output unit 1 | Motion trend of output unit 2 | Motion trend of output unit 3 | Motion trend of output unit 4 |
|---|---|---|---|---|---|
| | 5 | 1 | 0 | 0 | 1 |

| | | Motion frame 1 | Motion frame 2 | Motion frame 3 | Motion frame 4 | Motion frame 5 |
|---|---|---|---|---|---|---|
| | Time tag T (second) | 5 | 5 | 15 | 20 | 10 |
| Output unit 1 | Predetermined motion information M (degree) | 10 | 20 | 50 | 90 | 110 |
| Output unit 2 | Predetermined motion information M (degree) | 150 | 140 | 110 | 70 | 50 |
| Output unit 3 | Predetermined motion information M (degree) | 120 | 110 | 80 | 40 | 20 |
| Output unit 4 | Predetermined motion information M (degree) | 20 | 30 | 60 | 100 | 120 |

FIG. 2

| Header | Number of motion frames |
|---|---|
|  | 5 |

| | Motion frame 1 | Motion frame 2 | Motion frame 3 | Motion frame 4 | Motion frame 5 |
|---|---|---|---|---|---|
| Time tag T (second) | 5 ($T_1$) | 5 ($T_2$) | 15 ($T_3$) | 20 ($T_4$) | 10 ($T_5$) |
| Predetermined motion information M (degree) | 10 ($M_1$) | 20 ($M_2$) | 50 ($M_3$) | 90 ($M_4$) | 110 ($M_5$) |

| Current motion information M' (degree) |
|---|
| 35 |

| Header | Number of motion frames | Motion trend of output unit |
|---|---|---|
| | 5 | 1 |

| | Motion frame 1 | Motion frame 2 | Motion frame 3 | Motion frame 4 | Motion frame 5 |
|---|---|---|---|---|---|
| Time tag T (second) | 5 | 5 | 15 | 20 | 10 |
| Predetermined motion information M (degree) | 10 | 20 | 50 | 90 | 110 |

| Header | Number of motion frames | Motion trend of output 1 | Motion trend of output 2 | Motion trend of output 3 | Motion trend of output 4 |
|---|---|---|---|---|---|
| | 5 | 1 | 0 | 0 | 1 |

| | | Motion frame 1 | Motion frame 2 | Motion frame 3 | Motion frame 4 | Motion frame 5 |
|---|---|---|---|---|---|---|
| | Time tag T (second) | 5 | 5 | 15 | 20 | 10 |
| Output unit 1 | Predetermined motion information M (degree) | 10 | 20 | 50 | 90 | 110 |
| Output unit 2 | Predetermined motion information M (degree) | 150 | 140 | 110 | 70 | 50 |
| Output unit 3 | Predetermined motion information M (degree) | 120 | 110 | 80 | 40 | 20 |
| Output unit 4 | Predetermined motion information M (degree) | 20 | 30 | 60 | 100 | 120 |

AUTOMATIC MACHINE AND METHOD FOR CONTROLLING THE SAME

BACKGROUND OF THE INVENTION

1. Field of the Invention

The invention relates to an automatic machine and method for controlling the same and, more particularly, to an automatic machine and method capable of seamlessly and smoothly executing every motion.

2. Description of the Prior Art

Recently, due to technological advances, robots are getting more and more popular. Furthermore, the price of a robot is decreasing due to mass production, so people may possess a robot easily. In regard to the design of the robot, functions are getting more and more complicated and real-time reaction is emphasized, e.g. judgment and response result from environmental condition, interaction between user and robot, etc. Generally speaking, every motion of the robot is determined in advance and is set as a motion template. That is to say, every motion of the robot is set in order and can only be executed according to the preset template. However, the motions of different preset templates usually cannot be seamlessly executed, so that the motions of the robot will become unsmooth. Consequently, a user will feel uncomfortable with the unsmooth motions of the robot.

SUMMARY OF THE INVENTION

An objective of the invention is to provide an automatic machine and method capable of seamlessly and smoothly executing every motion.

According to one embodiment, an automatic machine of the invention comprises an output unit, a storage unit and a control unit. The control unit is electrically connected to the output unit and the storage unit. The storage unit stores a motion pattern. The motion pattern is corresponding to a command and records N predetermined motion information and N time tags, wherein N is a positive integer larger than one. Each of the N predetermined motion information is corresponding to one of the N time tags. The control unit receives the command, reads a current motion information of the output unit, looks the motion pattern up in the storage unit according to the command and the current motion information, determines that the current motion information is between an i-th predetermined motion information and an (i+1)-th predetermined motion information of the N predetermined motion information, calculates a time adjusting information by the (i+1)-th predetermined motion information, an (i+1)-th time tag of the N time tags, which is corresponding to the (i+1)-th predetermined motion information, and the current motion information, and controls the output unit to execute the (i+1)-th predetermined motion information according to the current motion information, a first time tag through an i-th time tag of the N time tags, and the time adjusting information, wherein i is a positive integer smaller than or equal to N−1.

According to another embodiment, the invention provides a method for controlling an automatic machine, wherein the automatic machine comprises an output unit and a storage unit. The method comprises receiving a command; reading a current motion information of the output unit; looking a motion pattern up in the storage unit according to the command and the current motion information, wherein the motion pattern records N predetermined motion information and N time tags, N is a positive integer larger than one, and each of the N predetermined motion information is corresponding to one of the N time tags; determining that the current motion information is between an i-th predetermined motion information and an (i+1)-th predetermined motion information of the N predetermined motion information, wherein i is a positive integer smaller than or equal to N−1; calculating a time adjusting information by the (i+1)-th predetermined motion information, an (i+1)-th time tag of the N time tags, which is corresponding to the (i+1)-th predetermined motion information, and the current motion information; and controlling the output unit to execute the (i+1)-th predetermined motion information according to the current motion information, a first time tag through an i-th time tag of the N time tags, and the time adjusting information.

As mentioned in the above, when the control unit of the automatic machine of the invention receives a command, the control unit reads the current motion information of the output unit and then calculating the time adjusting information according to the predetermined motion information and the time tags recorded in the motion pattern. Afterward, the control unit controls the output unit to execute the predetermined motion information according to the current motion information, the time tags and the time adjusting information. Accordingly, the automatic machine and controlling method of the invention can seamlessly and smoothly execute every motion so as to avoid unsmooth motions.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 2 is a schematic diagram illustrating the motion pattern and the current motion information.

FIG. 3 is a schematic diagram illustrating a motion pattern according to another embodiment of the invention.

FIG. 4 is a schematic diagram illustrating a motion pattern according to another embodiment of the invention.

DETAILED DESCRIPTION

Figure 1:
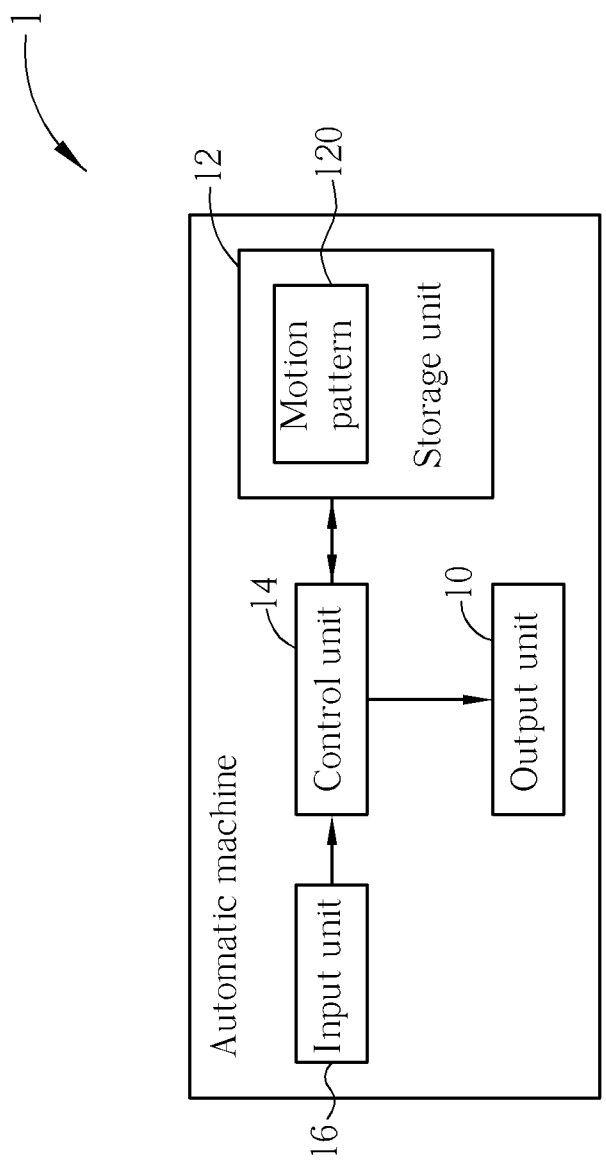
FIG. 1 is a functional block diagram illustrating an automatic machine according to one embodiment of the invention.

Referring to FIG. 1, FIG. 1 is a functional block diagram illustrating an automatic machine 1 according to one embodiment of the invention. The automatic machine 1 may be a robot. As shown in FIG. 1, the automatic machine 1 comprises an output unit 10, a storage unit 12, a control unit 14 and an input unit 16. The control unit 14 is electrically connected to the output unit 10, the storage unit 12 and the input unit 16. In this embodiment, the output unit 10 may be a motor. In practical applications, the output unit 10 can be used to drive motion of each part (e.g. head, upper limb, lower limb, etc.) of the automatic machine 1, and the number of the output unit 10 is not limited to one and it can be determined based on practical applications. The storage unit 12 may be a hard disc or other storage device capable of storing data. The control unit 14 may be a controller capable of calculating and processing data. The input unit 16 may be a microphone, a button or other input devices capable of inputting command.

As shown in FIG. 1, the storage unit stores a motion pattern 120 and the motion pattern 120 is corresponding to a command. It should be noted that the number of the motion pattern 120 is not limited to one and it can be determined based on practical applications. In this embodiment, the motion pattern 120 may record N predetermined motion information and N time tags, wherein N is a positive integer larger than one and each of the N predetermined motion information is corresponding to one of the N time tags.

Referring to FIG. 2, FIG. 2 is a schematic diagram illustrating the motion pattern 120 and the current motion information. As shown in FIG. 2, the motion pattern 120 comprises a header and five motion frames, wherein the header records the number of the motion frames and each of the motion frames records one predetermined motion information and one time tag. Provided that the output unit 10 is a motor, the predetermined information is a motor angle. Furthermore, the time tag may be a motion time. For example, the control unit 14 controls the output unit 10 to execute the predetermined motion information of the motion frame 2 only when the control unit 14 controls the output unit 10 to execute the predetermined motion information of the motion frame 1 completely and after five seconds; the control unit 14 controls the output unit 10 to execute the predetermined motion information of the motion frame 3 only when the control unit 14 controls the output unit 10 to execute the predetermined motion information of the motion frame 2 completely and after ten seconds; and so on.

In this embodiment, a user can use the input unit 16 to input a command so as to enable the control unit 14 to control the output unit 10 to execute the predetermined motion information according to the time tags of the motion pattern 120. After receiving the command corresponding to the motion pattern 120, the control unit 14 reads a current motion information of the output unit 10. For example, provided that the output unit 10 is a motor, the control unit 14 reads a current motor angle (i.e. current motion information) of the output unit 10. As shown in FIG. 2, the current motor angle (i.e. current motion information) read by the control unit 14 is 35 degrees. At the same time, the control unit 14 looks the motion pattern 120 in the storage unit 12 according to the command and the current motion information and determines that the current motion information is between the i-th predetermined motion information and the (i+1)-th predetermined motion information, wherein i is a positive integer smaller than or equal to N−1. Afterward, the control unit 14 calculates a time adjusting information by the (i+1)-th predetermined motion information, the (i+1)-th time tag, which is corresponding to the (i+1)-th predetermined motion information, and the current motion information. In this embodiment, the control unit 14 calculates the time adjusting information by an equation 1 as follows, $$T' = T_{i+1} - \frac{M_{i+1} - M'}{S}. \quad \text{Equation 1}$$

In equation 1, T' represents the time adjusting information, $T_{i+1}$ represents the (i+1)-th time tag, $M_{i+1}$ represents the (i+1)-th predetermined motion information, M' represents the current motion information, and S represents a rotational speed of the motor (i.e. the aforesaid output unit 10).

As shown in FIG. 2, provided that the current motion information M' is 35 degrees, the control unit 14 determines that the current motion information M' is between the second predetermined motion information $M_2$ (20 degrees) and the third predetermined motion information $M_3$ (50 degrees), wherein the third time tag $T_3$, which is corresponding to the third predetermined motion information $M_3$ (50 degrees), is 15 seconds. Afterward, the equation 1 can be used to calculate the time adjusting information T' corresponding to the current motion information M'. For example, provided that the rotational speed is 2 (degree/second), the equation 1 can be used to calculate the time adjusting information T' to be 7.5 seconds corresponding to the current motion information M' (35 degrees).

Finally, the control unit 14 controls the output unit 10 to execute the third predetermined motion information $M_3$ according to the current motion information M', the first time tag $T_1$ through the second time tag $T_2$, and the time adjusting information T'. For example, the control unit 14 controls the output unit 10 to rotate from the motor angle (35 degrees) represented by the current motion information M' to the motor angle (50 degrees) represented by the third predetermined motion information $M_3$ after the first time tag $T_1$ (5 seconds), the second time tag $T_2$ (5 seconds) and the time adjusting information T' (7.5 seconds), i.e. after 17.5 seconds. In other words, the control unit 14 will ignore the motor angle (10 degrees) represented by the first predetermined motion information and the motor angle (20 degrees) represented by the second predetermined motion information and then controls the output unit 10 to rotate at appropriate timing (i.e. after 17.5 seconds). Accordingly, the invention can seamlessly and smoothly control the output unit 10 of the automatic machine 1 to execute every motion so as to avoid unsmooth motions.

Referring to FIG. 3, FIG. 3 is a schematic diagram illustrating a motion pattern 120' according to another embodiment of the invention. Provided that the output unit 10 is a motor, the header may further record a motion trend and the motion trend represents a rotational direction of the motor. As shown in FIG. 3, provided that the motion trend is recorded as "1", the rotational direction of the motor is clockwise. On the other hand, provided that the motion trend is recorded as "0", the rotational direction of the motor is counterclockwise. Accordingly, the control unit 14 may determine that the current motion information is between which two predetermined motion information efficiently according to the motion trend recoded in the motion pattern 120'.

Referring to FIG. 4, FIG. 4 is a schematic diagram illustrating a motion pattern 120" according to another embodiment of the invention. As shown in FIG. 4, provided that the automatic machine of the invention comprises four output units, each motion frame of the motion pattern 120" records four predetermined motion information corresponding to the four output units respectively and the header records four motion trends corresponding to the four output units respectively.

Figure 5:
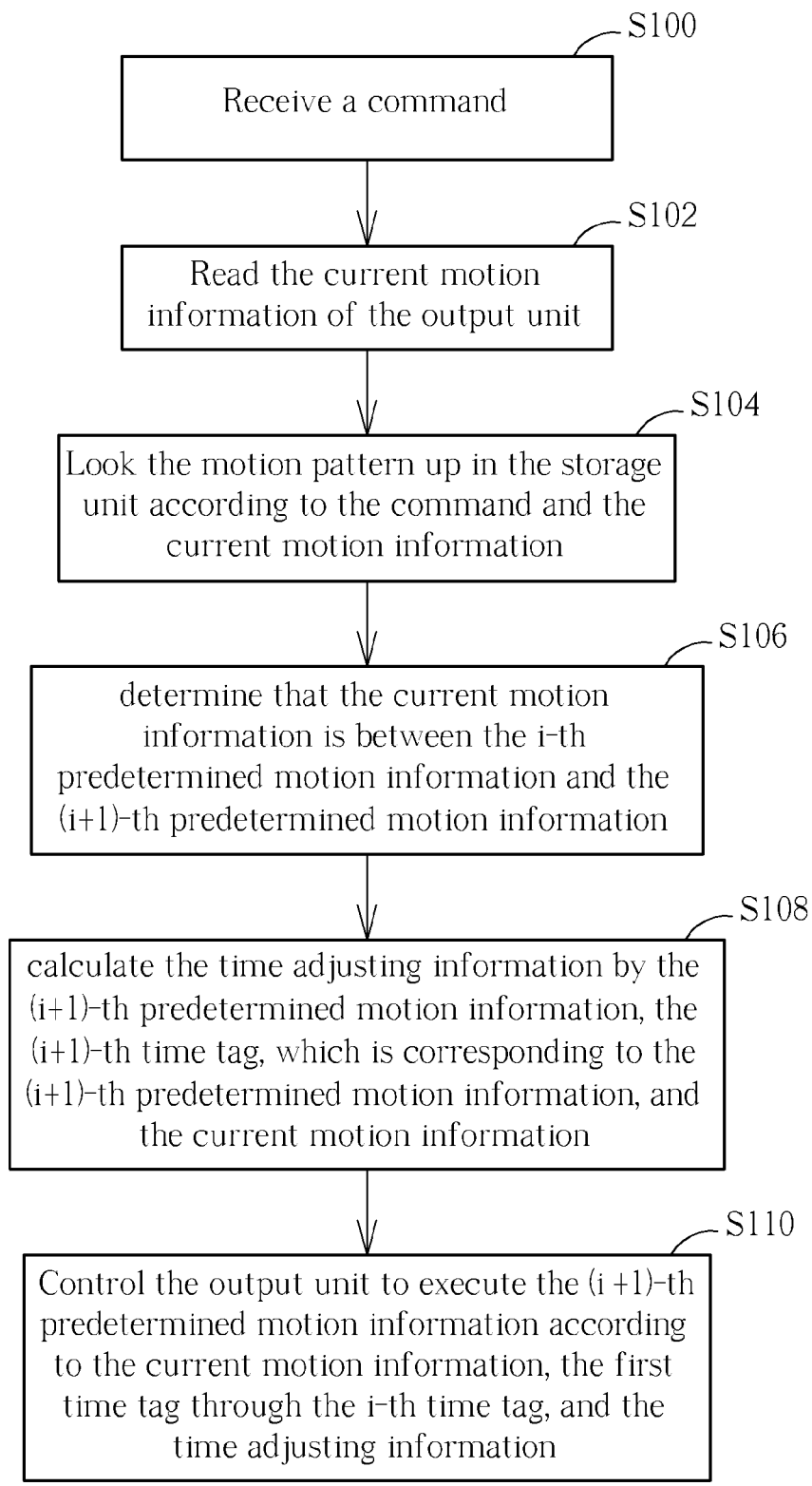
FIG. 5 is a flowchart illustrating a method for controlling the automatic machine according to one embodiment of the invention.

Referring to FIG. 5, FIG. 5 is a flowchart illustrating a method for controlling the automatic machine 1 according to one embodiment of the invention. Also, please refer to FIGS. 1 and 2 along with FIG. 5. First of all, step S100 is performed to receive a command. Afterward, step S102 is performed to read the current motion information of the output unit 10. Step S104 is then performed to look the motion pattern 120 up in the storage unit 12 according to the command and the current motion information. Step S106 is then performed to determine that the current motion information is between the i-th predetermined motion information and the (i+1)-th predetermined motion information. Step S108 is then performed to calculate the time adjusting information by the (i+1)-th predetermined motion information, the (i+1)-th time tag, which is corresponding to the (i+1)-th predetermined motion information, and the current motion information. Finally, step S110 is performed to control the output unit 10 to execute the (i+1)-th predetermined motion information according to the current motion information, the first time tag through the i-th time tag, and the time adjusting information.

Compared to the prior art, when the control unit of the automatic machine of the invention receives a command, the control unit reads the current motion information (e.g. current motor angle) of the output unit and then calculating the time adjusting information according to the predetermined motion information and the time tags recorded in the motion pattern. Afterward, the control unit controls the output unit to execute the predetermined motion information according to the current motion information, the time tags and the time adjusting information. Accordingly, the automatic machine and controlling method of the invention can seamlessly and smoothly execute every motion so as to avoid unsmooth motions.

Those skilled in the art will readily observe that numerous modifications and alterations of the device and method may be made while retaining the teachings of the invention.

What is claimed is:

1. An automatic machine comprising:
    an output unit;
    a storage unit for storing a motion pattern, the motion pattern being corresponding to a command and recording N predetermined motion information and N time tags, N being a positive integer larger than one, each of the N predetermined motion information being corresponding to one of the N time tags; and
    a control unit electrically connected to the output unit and the storage unit, the control unit receiving the command, reading a current motion information of the output unit, looking the motion pattern up in the storage unit according to the command and the current motion information, determining that the current motion information is between an i-th predetermined motion information and an (i+1)-th predetermined motion information of the N predetermined motion information, calculating a time adjusting information by the (i+1)-th predetermined motion information, an (i+1)-th time tag of the N time tags, which is corresponding to the (i+1)-th predetermined motion information, and the current motion information, and controlling the output unit to execute the (i+1)-th predetermined motion information according to the current motion information, a first time tag through an i-th time tag of the N time tags, and the time adjusting information, i being a positive integer smaller than or equal to N−1.

2. The automatic machine of claim 1, wherein the output unit is a motor, and each of the N predetermined motion information and the current motion information are a motor angle respectively.

3. The automatic machine of claim 1, wherein each of the N time tags and the time adjusting information are a motion time respectively.

4. The automatic machine of claim 1, wherein the output unit is a motor and the control unit calculates the time adjusting information by an equation as follows:

$$T' = T_{i+1} - \frac{M_{i+1} - M'}{S};$$

wherein T' represents the time adjusting information, $T_{i+1}$ represents the (i+1)-th time tag, $M_{i+1}$ represents the (i+1)-th predetermined motion information, M' represents the current motion information, and S represents a rotational speed of the motor.

5. The automatic machine of claim 1, wherein the motion pattern comprises a header and N motion frames, the header records a number of the motion frames, and each of the N motion frames records one of the N predetermined motion information and one of the N time tags.

6. The automatic machine of claim 5, wherein the output unit is a motor, the header further records a motion trend, the motion trend represents a rotational direction of the motor, the control unit determines that the current motion information is between the i-th predetermined motion information and the (i+1)-th predetermined motion information according to the motion trend.

7. A method for controlling an automatic machine, the automatic machine comprising an output unit and a storage unit, the method comprising:
    receiving a command;
    reading a current motion information of the output unit;
    looking a motion pattern up in the storage unit according to the command and the current motion information, the motion pattern recording N predetermined motion information and N time tags, N being a positive integer larger than one, each of the N predetermined motion information being corresponding to one of the N time tags;
    determining that the current motion information is between an i-th predetermined motion information and an (i+1)-th predetermined motion information of the N predetermined motion information, i being a positive integer smaller than or equal to N−1;
    calculating a time adjusting information by the (i+1)-th predetermined motion information, an (i+1)-th time tag of the N time tags, which is corresponding to the (i+1)-th predetermined motion information, and the current motion information; and
    controlling the output unit to execute the (i+1)-th predetermined motion information according to the current motion information, a first time tag through an i-th time tag of the N time tags, and the time adjusting information.

8. The method of claim 7, wherein the output unit is a motor, and each of the N predetermined motion information and the current motion information are a motor angle respectively.

9. The method of claim 7, wherein each of the N time tags and the time adjusting information are a motion time respectively.

10. The method of claim 7, wherein the output unit is a motor and the method further comprising:
    calculating the time adjusting information by an equation as follows:

$$T' = T_{i+1} - \frac{M_{i+1} - M'}{S};$$

wherein T' represents the time adjusting information, $T_{i+1}$ represents the (i+1)-th time tag, $M_{i+1}$ represents the (i+1)-th predetermined motion information, M' represents the current motion information, and S represents a rotational speed of the motor.

11. The method of claim 7, wherein the motion pattern comprises a header and N motion frames, the header records a number of the motion frames, and each of the N motion frames records one of the N predetermined motion information and one of the N time tags.

12. The method of claim 11, wherein the output unit is a motor, the header further records a motion trend, the motion trend represents a rotational direction of the motor, the method further comprising:
    determining that the current motion information is between the i-th predetermined motion information and the (i+1)-th predetermined motion information according to the motion trend.

* * * * *